(12) United States Patent
Subramaniam et al.

(10) Patent No.: US 9,220,291 B2
(45) Date of Patent: Dec. 29, 2015

(54) METHOD OF PRODUCING A REDUCED-CALORIE FOOD PRODUCT

(75) Inventors: Girish Subramaniam, Bangkok (TH); Teodoro Rivera, Algonquin, IL (US); Nicholas Shields, Carpentersville, IL (US); Diana Pesha, Chicago, IL (US)

(73) Assignee: Tropicana Products, Inc., Bradenton, FL (US)

( * ) Notice: Subject to any disclaimer, the term of this patent is extended or adjusted under 35 U.S.C. 154(b) by 1069 days.

(21) Appl. No.: 11/541,610

(22) Filed: Sep. 30, 2006

(65) Prior Publication Data

US 2008/0081096 A1 Apr. 3, 2008

(51) Int. Cl.
| | | |
|---|---|---|
| A23L 2/44 | (2006.01) | |
| A23L 1/307 | (2006.01) | |
| A23L 2/02 | (2006.01) | |
| A23L 2/06 | (2006.01) | |
| A23L 2/74 | (2006.01) | |

(52) U.S. Cl.
CPC . *A23L 1/307* (2013.01); *A23L 2/02* (2013.01); *A23L 2/06* (2013.01); *A23L 2/74* (2013.01)

(58) Field of Classification Search
CPC ....................................................... A23L 2/00
USPC ...................... 426/330, 330.5, 599, 490, 425; 210/651, 652
See application file for complete search history.

(56) References Cited

U.S. PATENT DOCUMENTS

| | | | |
|---|---|---|---|
| 4,102,743 A * | 7/1978 | Yokobayashi et al. | 435/276 |
| 4,322,448 A | 3/1982 | Matsuura et al. | |
| 4,333,770 A | 6/1982 | Neuzil et al. | |
| 4,792,402 A * | 12/1988 | Fricker | 210/651 |
| 4,933,197 A | 6/1990 | Walker et al. | |
| 4,959,237 A * | 9/1990 | Walker | 426/330.5 |
| 4,971,811 A | 11/1990 | Strobel et al. | |
| 5,403,604 A * | 4/1995 | Black et al. | 426/330.5 |
| 5,496,577 A | 3/1996 | Gresch | |
| 5,510,125 A | 4/1996 | Gresch | |
| 6,162,474 A * | 12/2000 | Chen et al. | 426/72 |
| 2004/0234658 A1 | 11/2004 | Bonnet et al. | |

FOREIGN PATENT DOCUMENTS

| | | |
|---|---|---|
| JP | 3-65166 A | 3/1991 |
| JP | 6-503480 A | 4/1993 |
| JP | 5-503018 A | 5/1993 |

(Continued)

OTHER PUBLICATIONS

Bohannon NV,Endocrine responses to sugar ingestion in man. Advantages of fructose over sucrose and glucose.,J Am Diet Assoc. Jun. 1980;76(6):555-60.*

(Continued)

*Primary Examiner* — Preston Smith

(74) *Attorney, Agent, or Firm* — James R. Gourley; Colin P. Cahoon; Carstens & Cahoon, LLP

(57) ABSTRACT

Calories in a juice can be reduced by selectively removing more sucrose than primary sugars, for example, glucose and fructose. An acceptable flavor profile can be achieved since the primary sugars have a higher perceived sweetness than sucrose. The food product processing system for reducing calories can include multiple stages for filtering the juice to produce a clarified low-calorie juice having an acceptable flavor profile.

33 Claims, 5 Drawing Sheets

(56) References Cited

FOREIGN PATENT DOCUMENTS

| | | | |
|---|---|---|---|
| JP | 6-506364 | A | 7/1994 |
| JP | 10-271980 | A | 10/1998 |
| JP | 11-318381 | A | 11/1999 |
| JP | 2002-360215 | A | 12/2002 |
| JP | 2002-360216 | A | 12/2002 |
| WO | 89/10703 | A1 | 11/1989 |
| WO | 8910703 | A | 11/1989 |
| WO | 9210948 | A | 11/1992 |

OTHER PUBLICATIONS

A M Fontvieille, Relative sweetness of fructose compared with sucrose in healthy and diabetic subjects., Chemical Senses May 1, 2001 26:371-383.*
International Search Report from corresponding PCT/US2007/078360.
Samsonova, et al., "Fruit and Vegetable Juices," Technique and Technology, 2nd Edition, 1990.
English Abstract of JP 10-271980.
English Abstract of WO 9307766 relating to JP 6-503480.
English Abstract of WO 9314650 relating to JP 6-506364.
English Abstract of CH682636 relating to JP 5-503018.
English Abstract of JP 3-65166.
English Abstract of JP 2002-360216.
English Abstract of JP 2002-360215.
English Abstract of JP 11-318381.
Office Action relating to corresponding IN Application No. 485/MUMNP/2009.
Office Action relating to corresponding UA Application No. a 2009 01981.
Redacted English Translation of Office Action relating to corresponding UA Application No. a 2009 01981.
Office Action relating to corresponding JP Application No. 2009-530517.
English Translation of Office Action relating to corresponding JP Application No. 2009-530517.
Office Action relating to corresponding RU Application No. 2009107723.
Redacted English Translation of Office Action relating to corresponding RU Application No. 2009107723.
Office Action relating to corresponding CN Application No. 200780036560.0.
English Translation of Office Action relating to corresponding CN Application No. 200780036560.0.
Office Action relating to corresponding KR Application No. 10-2009-7005307.
English Translation of Office Action relating to corresponding KR Application No. 10-2009-7005307.

* cited by examiner

US 9,220,291 B2

METHOD OF PRODUCING A REDUCED-CALORIE FOOD PRODUCT

FIELD OF THE INVENTION

The present invention relates generally to food products, and more particularly to a method of producing reduced-calorie food products.

BACKGROUND OF THE INVENTION

High caloric intake has been associated with various concerns, such as weight gain, leading to health problems. As consumers become more health and weight conscious, the calorie contents of foods are increasingly becoming a significant consideration. Food manufacturers have marketed wellness foods with lower calorie contents to attract health and weight conscious consumers. A significant market now exists for low-calorie foods.

However, low-calorie foods tend to lack flavor due to low sugar content or low perceived sweetness. Manufacturers have tried to counter this problem by adding high amounts of unnatural sugar substitutes and flavorings to make the food taste more like natural products. For example, low-calorie orange juice is produced by diluting reduced sugar orange juice and adding large quantities of artificial sweeteners, coloring and flavorings to make it resemble natural orange juice. However, such artificial ingredients produce an off-taste or lingering bitter aftertaste. Furthermore, certain artificial ingredients are believed to cause serious health problems and hence are not well-received by consumers. This is particularly true with low-calorie beverages.

From the foregoing discussion, it is desirable to provide a natural, reduced-calorie beverage without the negative characteristics of conventional low-calorie beverages.

SUMMARY OF THE INVENTION

The present invention relates to reducing calories in food products. The food product can be a juice such as a fruit or a vegetable juice. In one aspect of the invention, a method is disclosed which reduces calories by selectively removing more sucrose than primary sugars. Primary sugars include, for example, glucose and fructose. An acceptable flavor profile with a high perceived sweetness per calorie can be achieved since the primary sugars have a higher perceived sweetness than sucrose.

In another aspect, a food processing system is disclosed for reducing calories in juices. The food processing system comprises a micro-filtration stage for filtering a juice to produce a clarified juice and a nano-filtration stage for selectively removing more sucrose than primary sugars from the clarified juice to produce a clarified low-calorie juice having an acceptable flavor profile.

These and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION OF THE INVENTION

The present invention relates generally to food products and beverages having reduced calorie content. Calorie reduction is achieved with no or less reliance on artificial sugars than conventional low calorie beverages. In one embodiment, the low calorie beverage comprises of not-from-concentrate (NFC) or from-concentrate (FC) juices. Juice can be formed from fruit or vegetable sources. Preferably, the beverage comprises citrus juices. More preferably, the beverage comprises a not-from-concentrate (NFC) juice. Other types of fruit or vegetable juices include but are not limited to apricot, apple, grapefruit, lemon, tangerine, tangelo, kumquat, mango, pear, peach, pineapple, papaya, passion fruit, grape, strawberry, raspberry, currant, blueberry, blackberry, acai, lychee, kiwi, pomegranate, aronia, tomato, celery, onion, watercress, cucumber, carrot, parsley, beet, asparagus, potato, turnip, rutabaga, and any combination thereof.

Figure 1:
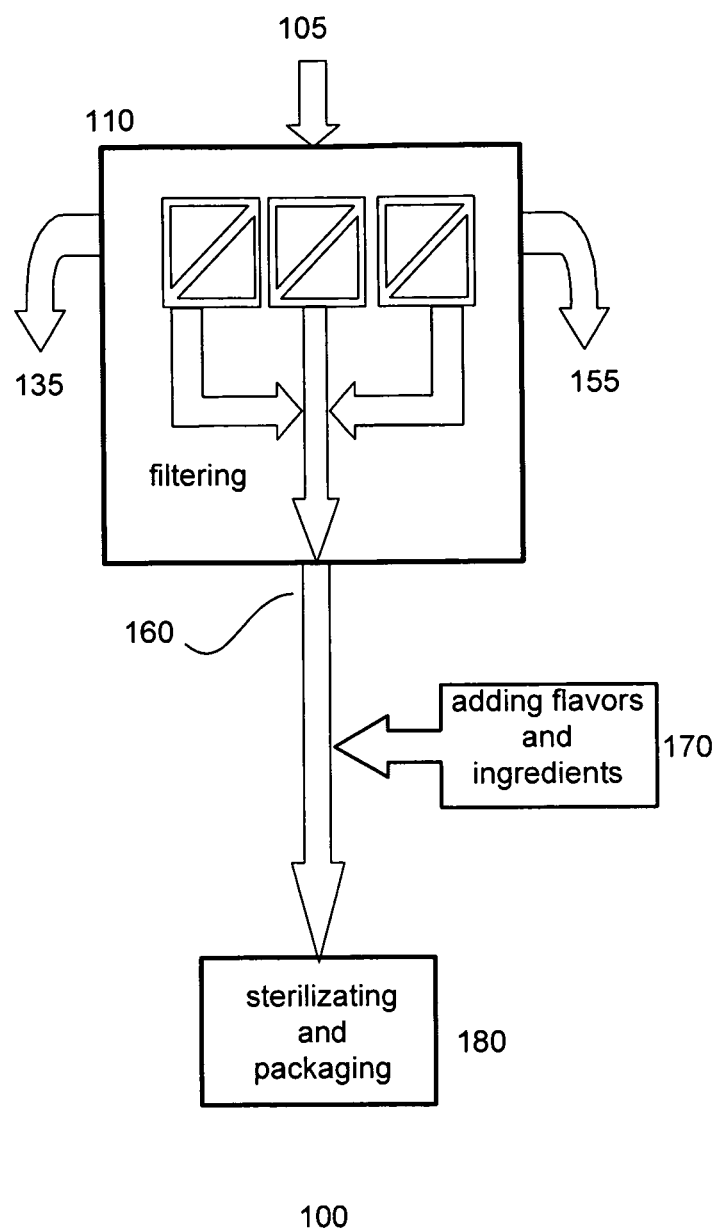
FIG. 1 shows a process for forming a food product in accordance with one embodiment of the invention.

FIG. 1 shows a process 100 for forming a reduced calorie beverage in accordance with one embodiment of the invention. In one embodiment, the process forms an NFC orange juice. Forming other types of juices is also useful. The process includes providing a feed juice 105 for processing. The feed juice comprises a single strength juice derived by various conventional techniques. Such techniques include, for example, mechanical extraction and finishing or reconstitution of juice concentrate with potable water.

Typically, the single strength juice has a brix of about 7° to about 22°, and preferably from about 9° to 14°. In one embodiment, the single strength juice has a brix of at least 7°, preferably at least 9°. In yet another embodiment, the single strength juice has a Brix of less than or equal to 22°, preferably less than or equal to 18°, more preferably less than or equal to 14°.

The use of a single strength juices with other brix levels are also useful. Lower or higher brix levels, for example, can be provided by mixing various fruit and/or vegetable juices, or by creating mixed drinks, beverages or smoothie-type products. The feed juice can include various additional ingredients such as vitamins and minerals, as desired. Other additives may also be useful. Ingredients can be added early or later in the process.

The feed juice is processed at step 110. Processing includes filtering the feed juice to produce a permeate portion 160. In one embodiment, the permeate comprises a low brix clarified juice. Clarified juice is a juice in which the sinking solids have been separated from the feed juice. Sinking solids, for example, include pulp, cloud components and other types of solids. The sinking solids form a primary retentate portion 135.

The permeate has a brix which is less than the brix of the feed juice. For example, in the case where the feed juice has a brix of about 12°, the permeate would then have a brix which is less than 12°. In one embodiment, the brix of the permeate is about 0 to 30 percent less than the brix of the feed juice, preferably 0 to 20 percent less than the brix of the feed juice. Providing a permeate having a brix which is lower than the brix of the feed juice by other percentages may also be useful, depending on the application. In one embodiment, the brix of the permeate is about 5 to 8. Other brix values of the permeate less than the brix of the feed juice are also useful.

The sugar content in the feed juice comprises sucrose, glucose and fructose. Typically, the ratio of sucrose, glucose and fructose in the feed juice is 2:1:1. or purposes of discussion, glucose and fructose are referred to as primary sugars. As such, the ratio of sucrose and primary sugars in the feed juice is 1:1.

To reduce the amount of calorie content in the juice, carbohydrates are selectively separated. In one embodiment, sugars are selectively separated. Preferably, sucrose is selectively removed while retaining primary sugars in the permeate. The retentate forms a high brix solution 155, having a brix which is greater than brix of the feed juice. In one embodiment, the brix of the retentate is about 15° to about 25°, and preferably about 20°. Providing other brix values for the retentate which is greater than brix of the feed juice is also be useful.

In accordance with one embodiment of the invention, sugar content of the permeate comprises a sucrose to primary sugars ratio which is lower than the sucrose to primary sugars ratio of the feed juice. This is achieved by reducing the amount of sucrose in the sugar content of the permeate. In one embodiment, the sucrose content of the sugar contained in the permeate is reduced to about 0-30 wt % while the primary sugars content is about 70-100 wt %. The ratio of sucrose, glucose and fructose of the permeate, in one embodiment, is about 2:1:1 to 1:2:2. The ratio of sucrose and fructose of the permeate, in one embodiment, is about 1:40 to about 4:1, and preferably between about 1:20 to about 2:1.

At step 170, the permeate is mixed with ingredients to form the final low brix juice. One of the ingredients added is the primary retentate 135 containing solids from the feed juice. PH adjusters, such as monopotassium phosphate, potassium citrate, citric acid, malic acid, or a combination thereof can be added to adjust the pH of the juice. Other ingredients, such as vitamins, flavorings including orange oil (e.g., PPOJ BN #95768) can also be added as desired. The total amount of vitamins and flavoring can be about 0.9 wt % and 0.006 wt %, respectively. Other amounts are also useful. In one embodiment, a vitamin premix comprising about B1, B6, C, magnesium, sucralose and acesulfame potassium. The premix, for example, includes about 0.2 wt % of B1, 0.1 wt % of B6, 46 wt % of C, 23 wt % of magnesium, 15.35 wt % of sucralose and 15.35 wt % of acesulfame potassium. About 0.09 wt % of the vitamin premix is added to the clarified juice. Other formulations including other ingredients are also useful.

Final processing of the juice is performed at step 180. The juice, for example, is sterilized and packaged. The juice is packaged into, for example, suitable cartons, jugs, cans or bottles. The packaged products may then be labeled and packaged for shipping.

In accordance with the invention, the low brix clarified juice is obtained using a multi-stage filtering process. The multi-stage filtering process includes an initial stage for coarse filtering and a secondary stage for fine filtering. The coarse and fine filtering stages can each include one or more sub-filtering stages. The sub-filtering stages can be in sequence, parallel or a combination thereof. In one embodiment, the coarse and fine filtering stages are implemented with membrane technology. Membrane technology includes microfiltration, nano-filtration and ultra-filtration. Other techniques, such as centrifugation, are also useful.

The coarse filtering stage produces primary retentate and primary permeate streams. The primary retentate contains the sinking solids of the feed juice while the primary permeate contains the clarified juice. The primary permeate is filtered by the fine filtering stage. The fine filtering stage selectively separates the carbohydrates or sugars from the clarified juice. Secondary retentate and secondary permeate streams are produced by the fine filtering stage. The secondary retentate contains a high brix solution while the secondary permeate contains the low brix clarified juice.

In one embodiment, the permeate contains a higher ratio of fructose to sucrose than the retentate. This advantageously reduces the number of calories in the low brix clarified juice while maintaining an acceptable flavor profile of the juice. Preferably, the ratio is sufficient to maintain an acceptable flavor profile. In one embodiment, flavor profiles are found to be acceptable when the ratio of fructose to sucrose in the permeate is between about 1:4 and about 40:1, and more preferably between about 1:2 to about 20:1.

Since sugars, such as fructose, are generally perceived to be sweeter by about 10-70% than sucrose, a higher perceived sweetness per calorie can be achieved by having a higher ratio of fructose to sucrose. Less or no artificial sweeteners need to be added to the final beverage blend to achieve an acceptable flavor profile, advantageously creating a more "natural" beverage product. Juices may also contain other sugars that can be selectively separated using the method of the instant invention.

Table 1 shows an example of the composition of a final orange juice product having only about 50 calories per 8 oz. serving in contrast to the conventional 110 calories per 8 oz. serving, in accordance with one embodiment of the invention. This invention can be applied to derive other higher or lower calorie products.

TABLE 1

| Ingredient | % weight | g/serving (8 fl oz) |
|---|---|---|
| Coarse filtration Retentate | 50 | 125 |
| Fine filtration Permeate | 50 | 125 |
| Orange Oil | 0.006 | 0.015 |
| Monopotassium Phosphate | 0.15 | 0.375 |
| Vitamin premix | 0.09 | 0.225 |

Figure 2:
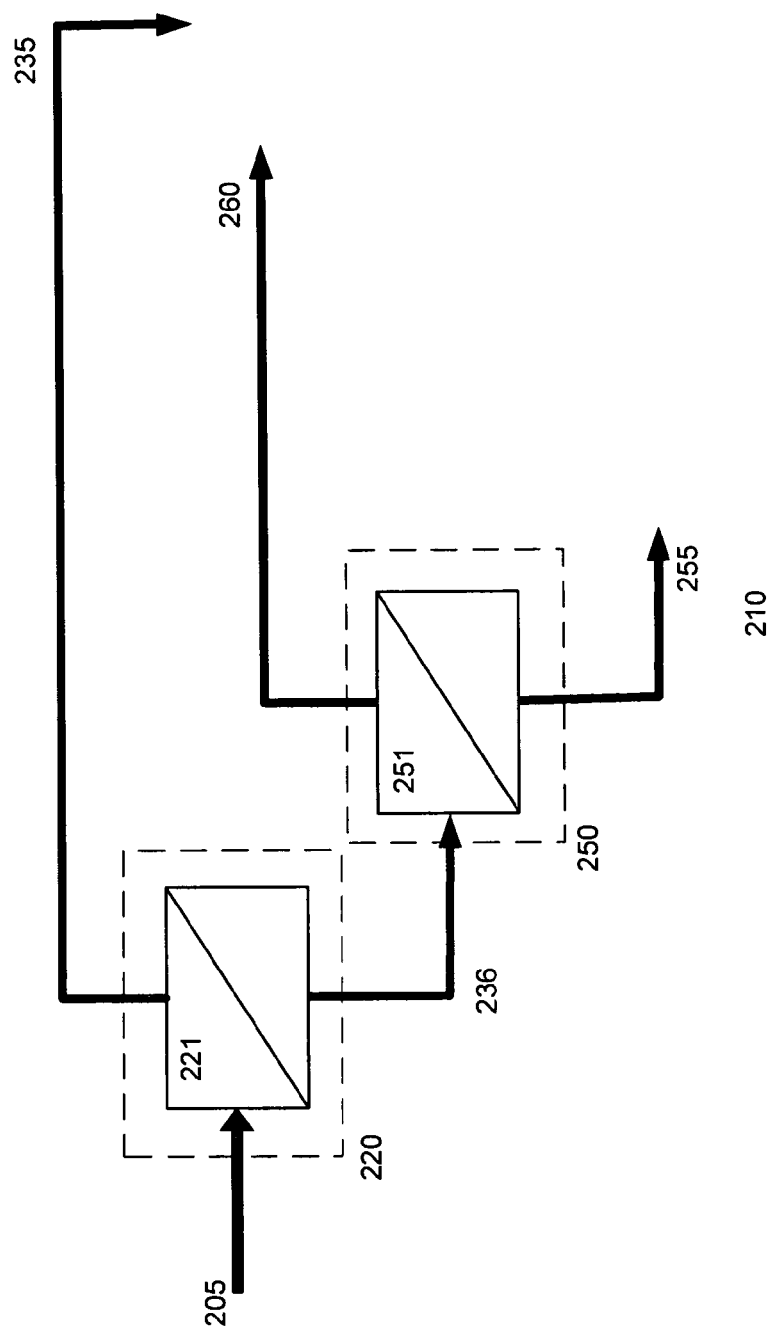
FIGS. 2-5 show filtration processes in accordance with various embodiments of the invention.

FIGS. 2-5 show filtering processes in accordance with various embodiments of the invention. Referring to FIG. 2, a multi-stage filtering process 210 comprising a coarse filtering stage 220 and a fine filtering stage 250 is shown. In one embodiment, the coarse filtering stage 220 comprises a micro-filtration unit 221 which receives a feed juice 205.

In one embodiment, the micro-filtration (MF) unit 221 comprises a micro-filter membrane to clarify the feed juice 205. However, any other method known to those skilled in the art, such as centrifugation or ultra-filtration, can be used. The micro-filter membrane separates the feed juice into a stream of sinking solids 235 (primary or MF retentate) and a stream of clarified juice 236 (primary or MF permeate). In one embodiment, the MF unit produces an MF retentate of about 2× to 5× concentration. Preferably, the MF retentate is about 3× concentration. Other concentrations may also be useful. Higher concentrations, although may be useful, have been found to extend processing time and/or require additional membrane units.

Various types of micro-filtration skids can be used to achieve the target concentration. In one embodiment, the MF unit comprises a micro-filtration skid from Koch Membrane Systems (USA). Other types of membranes are, such as those manufactured by Dow Chemical Company (US) and SCT Membralox (France), can be used, as well as other known systems. The pore size of the micro-filter membrane is preferably small enough to prevent larger undesirable molecules from passing through the membrane and affecting the efficiency of downstream filtration. In one embodiment, the pore size is about 0.1 to 10 micrometers, which corresponds to a molecular weight cut-off (MWCO) of about 100,000 to about 5,000,000.

The filtering is designed to have a predetermined output, e.g., gallons per minute (gpm). The predetermined output is selected to satisfy the desired throughput. For example, a production line for processing orange juice has an output of about 100 gpm. Other predetermined output levels are also useful. Pressure of the filtering process can be adjusted to achieve the predetermined output. Preferably, the feed stream is passed through the micro-filtration skid at a pressure sufficient to pass the desirable aroma, flavor and nutrient components through micro-filtration skid. One skilled in the art will know how to adjust the pressure, flow rate and other process conditions as required using the micro-filtration skid of this present invention.

The MF permeate stream or clarified juice is processed by the fine filtering stage. The fine filtration unit comprises a nano-filtration (NF) unit which reduces sugar from the clarified juice to produce a low brix clarified juice (NF permeate) 260. The separated sugar forms a high brix solution (NF retentate) 255.

In one embodiment, the NF unit selectively removes sucrose in the clarified juice. The selective removal of sucrose results in a sucrose concentration of about 15 Brix to about 25 Brix. Preferably, the sucrose concentration is about 20 Brix. The NF retentate, in one embodiment, is about 2×-5× concentration of the clarified juice. Preferably, the NF retentate is about 2× concentration of the clarified juice. Higher concentrations, although may be useful, have been found to extend processing time and/or require additional membrane units.

To selectively remove sucrose, NF membranes are employed. Various types of NF membranes can be used in the NF unit. In one embodiment, the pore-size of the NF membrane is small enough to prevent more sucrose molecules than primary sugar molecules from passing through. Sucrose has a molecular weight (MW) of about 342 while the primary sugars such as fructose and glucose have a molecular weight of about 180. In one embodiment, the pore size is about 0.001 microns, which corresponds to a molecular weight cut-off (MWCO) of about 200.

The pressure and flow rate are selected to cause a stream containing the smaller primary sugar molecules to pass through the NF membrane and collected in the NF permeate stream 260, while retaining the larger sucrose molecules in the NF retentate stream 255. One skilled in the art will know how to adjust the pressure as required using the NF membrane of this present invention.

The overall calorie reduction process can be carried out in various temperatures. Preferably, the overall process is performed at refrigerated temperatures to produce a higher quality product. Refrigerated temperatures are preferably less than about 45° F., and more preferably between about 32° to 38° F.

The system can be operated in batch mode or continuous close-coupled mode. When the system is operated in batch mode, interim stabilization of the juice by heat pasteurization is useful to prevent enzyme and microbiological degradation. When the system is operated in continuous mode, intermediate pasteurization may be avoided.

The low brix clarified juice is then further processed, such as blending with MF retentate in the desired ratios. Other processes include those described in steps 178 and 180 of FIG. 1.

Figure 3:
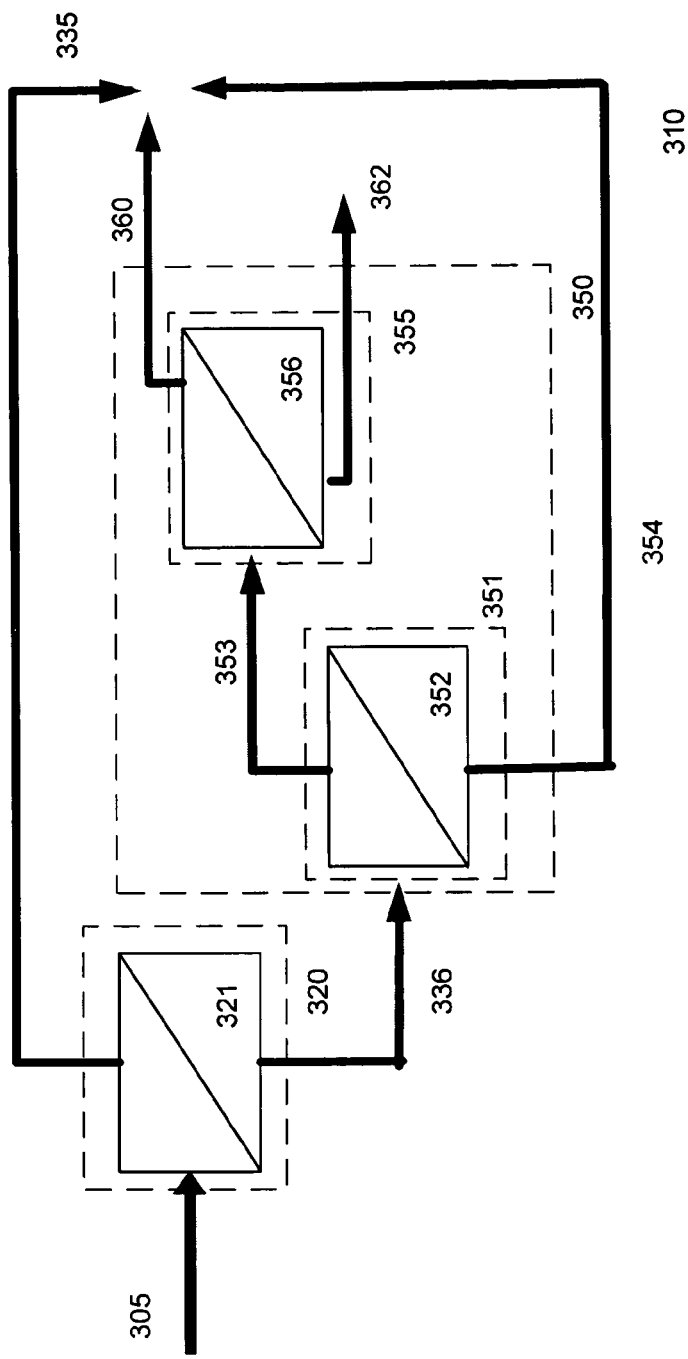

FIG. 3 shows another filtering process 310 in accordance with one embodiment of the invention. The coarse or micro-filtration stage 320, as shown, is similar to that described in FIG. 2. For example, a feed juice 305 is processed by a MF unit 321, producing a MF retentate stream 335 containing sinking solids and MF permeate stream 336 containing clarified juice which is processed by the fine or nano-filtration stage 350.

As shown, the NF filtration stage 350 comprises first and second sub-stages 351 and 355. The first sub-stage comprises a first NF (NF1) filtration unit 352, similar to the NF filtration unit described in FIG. 2. The MF permeate 336 is processed by the NF1 filtration unit 352, forming NF1 permeate 354 containing a low brix clarified juice and NF1 retentate 353 containing a high brix solution. In one embodiment, the high brix solution comprises a sucrose concentration of about 15 Brix to about 25 Brix, preferably about 20 Brix.

In one embodiment, the second sub-stage 355 comprises a reverse osmosis (RO) unit 356. Any suitable RO membrane system, such as the ones manufactured by Koch Membrane Systems (USA) can be used, as well as other known systems. The RO filtration unit further concentrates the NF1 retentate stream 353 to produce an RO permeate 360 containing very low brix water (e.g., about 1 Brix or less) and an RO retentate 362 containing a very high brix solution (e.g., 40 Brix). The RO permeate water stream can be recycled in the process for various purposes, including but not limited to blending or washing. For example, the water may be blended with the reduced-calorie NF permeate stream 354 and the MF retentate stream 335 to form the final juice product.

The RO retentate (i.e. high sugar by-product) can be used as a supplementary sweetener in other juice products (not the low calorie product discussed in the present invention). Preferably, the proportions of the respective components from the overall calorie reduction system are chosen to sustain the mass balance between the various fractions and generate only a high sugar by-product that may be utilized as a supplementary sweetener. The high sugar by-product comprises, in one embodiment, the NF retentate stream 255, such as shown in FIG. 2.

Alternatively, the NF retentate stream can be further concentrated by a reverse osmosis unit to produce the high sugar by-product 362, as shown in FIG. 3. The high sugar by-product can be surged in a hold tank and re-used in other product types as needed. In the embodiment where reverse osmosis is used, a smaller surge tank may be required, but an additional water surge tank may be required for the water permeate. By maximizing use of lower calorie streams in producing the final juice product, cost of raw materials, such as water and artificial sweeteners, is advantageously reduced, while at the same time, producing a product closer to a "natural" reduced calorie product.

Figure 4:
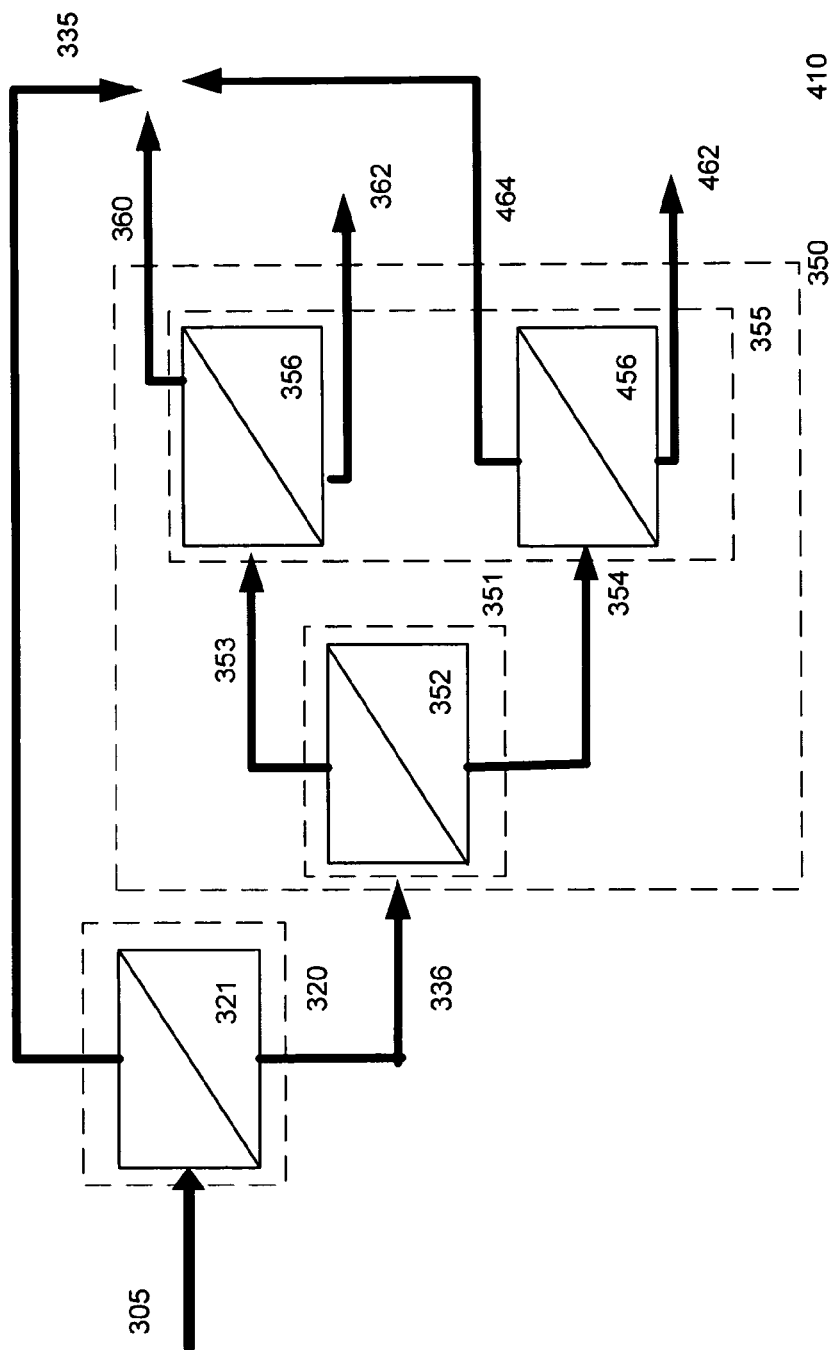

There can be additional NF units, preferably in parallel, but may also be in series, or a combination thereof. For example, FIG. 4 shows a filtering process 410 that includes a second sub-stage 355 that comprises a second NF (NF2) filtration unit 456. The NF1 permeate stream 354 is processed by the NF2 unit to form NF2 permeate 464 containing a low brix clarified juice and NF2 retentate 462 containing a high brix solution. In one embodiment, the low brix solution comprises a sucrose concentration of about 5 Brix. Alternative configurations are also useful. The number of units used is determined by efficiency and cost considerations.

Figure 5:
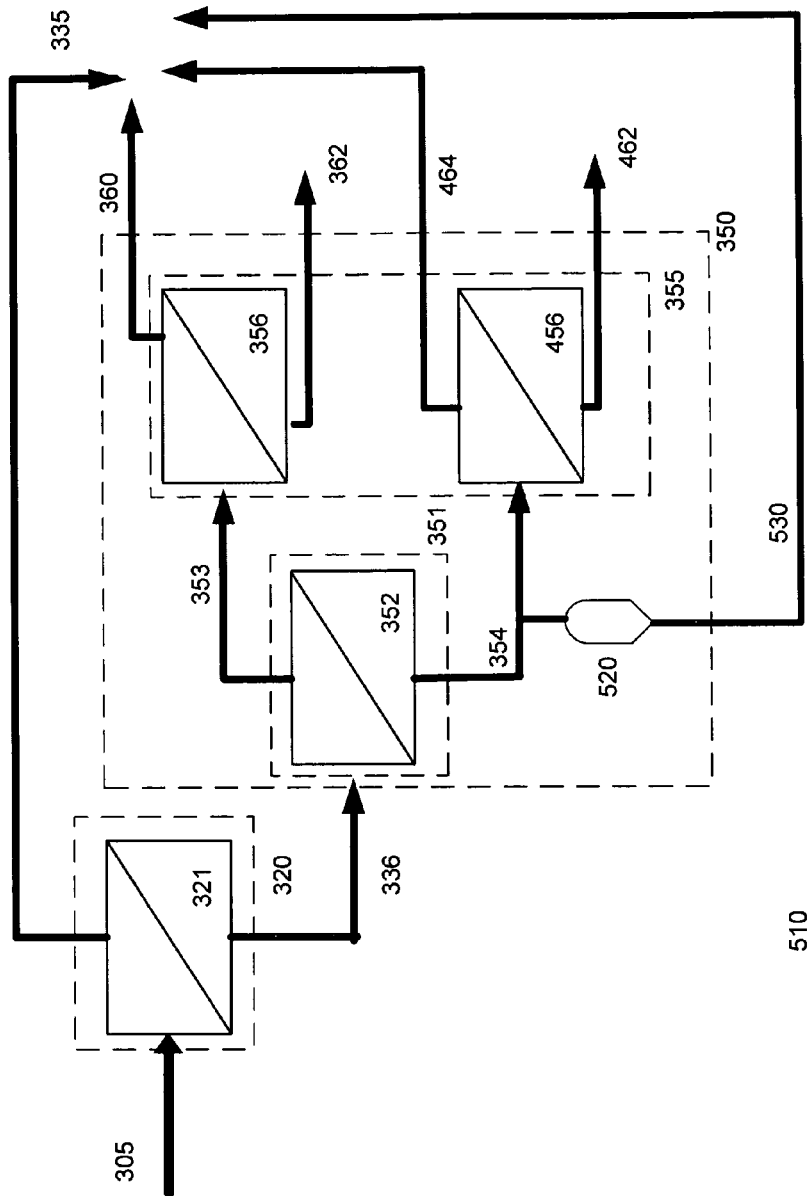

FIG. 5 shows a filtering process 510 in accordance with another embodiment of the invention. The filtering process further includes a volatile recovery unit 520 coupled to the NF1 permeate stream. The volatiles recovery unit can improve the flavor of the final beverage product by preserving aroma and flavor volatile compounds that can easily be lost due to volatilization during processing. Such aroma and flavor volatile compounds include, for example, low molecular weight alcohols or oils, such as ethanol and methanol, as well as aldehydes and esters.

In one embodiment, the volatiles recovery unit heats the NF1 permeate stream and strips it with a stripping agent to remove aroma or flavor volatiles. The stripping agent can be steam or an inert gas, such as nitrogen or carbon dioxide. Heating can be carried out using heat exchangers or live steam injection to a stripping temperature above the equilibrium temperature. The stripped volatiles 530 may then, optionally, be condensed and recombined with the NF2 permeate 464 and the RO permeate 360 to form the final juice product.

While the invention has been particularly shown and described with reference to various embodiments, it will be recognized by those skilled in the art that modifications and changes may be made to the present invention without departing from the spirit and scope thereof. The scope of the invention should therefore be determined not with reference to the above description but with reference to the appended claims along with their full scope of equivalents.

What is claimed is:

1. A method for producing a juice product comprising:
providing a juice;
processing the juice to selectively remove more sucrose than monosaccharides to produce a stream of clarified low-calorie juice; and
producing a juice product from the clarified low-calorie juice, wherein sugar content of the juice product comprises 0 to 30 wt. % sucrose, and wherein the juice product contains no artificial sweeteners.

2. The method of claim 1, wherein the juice comprises a fruit juice, a vegetable juice, or any combination of fruit juice and vegetable juice.

3. The method of claim 2, wherein the juice comprises not-from-concentrate orange juice.

4. The method of claim 2, wherein the juice comprises from-concentrate orange juice.

5. The method of claim 1, wherein the juice comprises a single strength juice having a brix between 7 and 22.

6. The method of claim 5, wherein the clarified low-calorie juice comprises a brix of less than the brix of the single strength juice.

7. The method of claim 6, wherein the clarified low-calorie juice has a brix that is 0 to 30% less than the brix of the single strength juice.

8. The method of claim 6, wherein the brix of the clarified low-calorie juice is 10 to 20% less than the brix of the single strength juice.

9. The method of claim 6, wherein the clarified low-calorie juice comprises a brix between 5 and 8.

10. The method of claim 1, wherein the monosaccharides include fructose.

11. The method of claim 10, wherein the clarified low-calorie juice comprises a ratio of sucrose to fructose of between 1:40 and 4:1.

12. The method of claim 11, wherein the clarified low-calorie juice comprises a ratio of sucrose to fructose of between 1:20 and 2:1.

13. The method of claim 1 wherein the step of processing the juice comprises the steps of:

coarse filtering the juice to produce a primary retentate stream and a primary permeate stream, the primary retentate stream comprising sinking solids of the juice and the primary permeate stream comprising a clarified juice; and
fine filtering the primary permeate stream to selectively remove more sucrose than monosaccharides, the fine filtering producing a secondary retentate stream and a secondary permeate stream, the secondary retentate stream comprising a high brix solution and the secondary permeate stream comprising the clarified low-calorie juice.

14. The method of claim 13, wherein the clarified low-calorie juice comprises a ratio of sucrose to fructose of between 1:40 and 4:1.

15. The method of claim 14, wherein the clarified low-calorie juice comprises a ratio of sucrose to fructose of between 1:20 and 2:1.

16. The method of claim 13, wherein the coarse filtering step comprises microfiltering.

17. The method of claim 16, wherein the microfiltering comprises passing the juice through a micro-filtration membrane having a molecular cut-off of between 100,000 and 5,000,000.

18. The method of claim 16, wherein the fine filtering step comprises nano-filtering.

19. The method of claim 18, wherein the nano-filtering comprises passing the primary permeate stream through a nano-filtration membrane having a molecular cut-off of 200.

20. The method of claim 13, wherein the fine filtering step comprises nano-filtering.

21. The method of claim 20, wherein the nano-filtering comprises passing the primary permeate stream through a nano-filtration membrane having a molecular cut-off of 200.

22. The method of claim 18, wherein the nano-filtering comprises a first nano-filtration sub-stage and a second nano-filtration sub-stage, wherein the first nano-filtration sub-stage processes the primary permeate stream to produce a first nano-filtration retentate stream and a first nano-filtration permeate stream, and the second nano-filtration sub-stage processes the first nano-filtration retentate stream to produce a second nano-filtration retentate stream and a second nano-filtration permeate stream.

23. The method of claim 22, wherein the first nano-filtration sub-stage performs nano-filtration.

24. The method of claim 23, wherein the second nano-filtration sub-stage performs reverse osmosis.

25. The method of claim 24, wherein the second nano-filtration permeate stream comprises a low brix water by-product that is recycled in the method.

26. The method of claim 25, wherein the low brix water by-product comprises a brix of less than or equal to 1.

27. The method of claim 22, further comprising the step of stripping volatiles from the first nano-filtration permeate stream using a volatiles recovery unit.

28. The method of claim 27, further comprising the step of recombining the stripped volatiles with the second nano-filtration permeate stream to form the clarified low-calorie juice.

29. A method for producing a juice product comprising:
providing a juice;
processing the juice to selectively remove more sucrose than monosaccharides to produce a stream of clarified low-calorie juice; and
producing a juice product from the clarified low-calorie juice, wherein sugar content of the juice product comprises 0 to 30 wt. % sucrose, wherein the juice product has a brix between 9 and 14, and wherein the juice product contains no artificial sweeteners.

30. A method for producing a juice product comprising:
providing a juice;
processing the juice to selectively remove more sucrose than monosaccharides to produce a stream of clarified low-calorie juice; and
producing a juice product from the clarified low-calorie juice, wherein the juice product comprises a fructose to sucrose ratio of between 1:2 and 20:1, wherein sugar content of the juice product comprises between 0 wt. % and 30 wt. % sucrose, and between 70 wt. % and 100 wt. % primary sugars, and
wherein the juice product contains no artificial sweeteners.

31. A method for producing a juice product comprising the steps of:
providing a juice;
coarse filtering the juice to produce a primary retentate stream and a primary permeate stream, the primary retentate stream comprising sinking solids of the juice and the primary permeate stream comprising a clarified juice;
fine filtering the primary permeate stream to selectively remove more sucrose than monosaccharides, the fine filtering producing a secondary retentate stream and a secondary permeate stream, the secondary retentate stream comprising a high brix solution and the secondary permeate stream comprising the clarified low-calorie juice; and
combining the primary retentate stream and the clarified low-calorie juice to produce a juice product having no artificial sweeteners and comprising between 0 wt. % and 30 wt. % sucrose.

32. The method of claim 31, wherein the primary retentate stream and the clarified low-calorie juice are present in the juice product in a ratio of 50:50 by wt. % primary retentate stream : secondary permeate stream.

33. The method of claim 31, further comprising the step of combining the primary retentate stream and the clarified low-calorie juice with one or both of a vitamin premix and orange oil.

* * * * *